US010677379B2

(12) United States Patent
Nishi et al.

(10) Patent No.: US 10,677,379 B2
(45) Date of Patent: Jun. 9, 2020

(54) LAMINATE

(71) Applicant: AGC Inc., Chiyoda-ku (JP)

(72) Inventors: Eiichi Nishi, Chiyoda-ku (JP); Tomoya Hosoda, Chiyoda-ku (JP); Toru Sasaki, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/722,625

(22) Filed: Oct. 2, 2017

(65) Prior Publication Data

US 2018/0038523 A1   Feb. 8, 2018

Related U.S. Application Data

(63) Continuation of application No. PCT/JP2016/066479, filed on Jun. 2, 2016.

(30) Foreign Application Priority Data

Jun. 5, 2015   (JP) .................. 2015-114710

(51) Int. Cl.
| | | |
|---|---|---|
| B32B 7/10 | (2006.01) | |
| F16L 11/12 | (2006.01) | |
| B32B 27/30 | (2006.01) | |
| B32B 1/08 | (2006.01) | |
| B32B 27/08 | (2006.01) | |
| B32B 27/32 | (2006.01) | |
| B32B 27/34 | (2006.01) | |
| C08F 214/26 | (2006.01) | |

(52) U.S. Cl.
CPC .............. *F16L 11/125* (2013.01); *B32B 1/08* (2013.01); *B32B 27/08* (2013.01); *B32B 27/30* (2013.01); *B32B 27/322* (2013.01); *B32B 27/34* (2013.01); *C08F 214/265* (2013.01); *B32B 2307/30* (2013.01); *B32B 2307/54* (2013.01); *B32B 2307/546* (2013.01); *B32B 2307/558* (2013.01); *B32B 2597/00* (2013.01); *C08F 2800/10* (2013.01)

(58) Field of Classification Search
CPC .. B32B 7/10; B32B 27/08; B32B 1/08; Y10T 428/1352
USPC ..................... 428/35.7, 36.6, 36.7
See application file for complete search history.

(56) References Cited

U.S. PATENT DOCUMENTS

| | | |
|---|---|---|
| 6,165,575 A | 12/2000 | Nishi et al. |
| 6,524,671 B1 | 2/2003 | Spohn |
| 6,680,124 B1 | 1/2004 | Araki et al. |
| 2002/0119319 A1 | 8/2002 | Funaki et al. |
| 2003/0162923 A1 | 8/2003 | Funaki et al. |
| 2006/0088680 A1 | 4/2006 | Kitahara et al. |
| 2007/0056681 A1 | 3/2007 | Aida et al. |

FOREIGN PATENT DOCUMENTS

| | | |
|---|---|---|
| CN | 103476577 | 12/2013 |
| JP | 4-267143 | 9/1992 |
| JP | 10-311461 | 11/1998 |
| JP | 11-320770 | 11/1999 |
| JP | 2002-514139 | 5/2002 |
| JP | 2002-327018 | 11/2002 |
| JP | 2004-238405 | 8/2004 |
| JP | 2007-216387 | 8/2007 |
| JP | 2007-230225 | 9/2007 |
| JP | 2015-54431 | 3/2015 |
| WO | WO 99/45044 A1 | 9/1999 |
| WO | WO 2004/058833 A1 | 7/2004 |
| WO | WO 2005/068191 A1 | 7/2005 |

OTHER PUBLICATIONS

Rilsan®HT CESV Black P010TL (Year: 2011).*
International Search Report dated Aug. 2, 2016 in PCT/JP2016/066479, filed on Jun. 2, 2016.

* cited by examiner

*Primary Examiner* — Ellen S Hock
(74) *Attorney, Agent, or Firm* — Oblon, McClelland, Maier & Neustadt, L.L.P.

(57) ABSTRACT

To provide a laminate which is formed from resins and is excellent in heat resistance and excellent in flexibility and mechanical properties under high-temperature conditions and which undergoes no separation of layers even when contacted with oil such as engine oil for a long period of time. The laminate comprises a first layer containing a fluorinated copolymer and a second layer containing a polyamide directly laminated on the first layer, wherein the fluorinated copolymer has units based on tetrafluoroethylene, units based on ethylene, units based on a copolymerizable another monomer not having a carbonyl group, and carbonyl group-containing groups, wherein the amounts of the respective units are in specific ranges, and the tensile elongation at 200° C. of the fluorinated copolymer is at least 200%, and the melting point of the polyamide and the flexural elastic modulus at 23° C. of the second layer are in specific ranges.

17 Claims, No Drawings

LAMINATE

TECHNICAL FIELD

The present invention relates to a laminate comprising a layer containing a fluorinated copolymer and a layer containing a polyamide resin.

BACKGROUND ART

In recent years, with increasing global awareness of environmental issues as background, strengthening of exhaust gas regulations for diesel vehicles is progressing. Along with this, introduction of a DPF (Diesel Particulate Filter) system, a turbo system, a new engine system (common rail injection system), etc. is well underway in order to reduce PM (particulate matter), NOx, etc. in the exhaust gas, and the requirements for performance of air hoses for diesel vehicles, air hoses for automobiles such as DPF sensor hoses, etc. have also become stricter.

That is, in order to reduce PM or NOx in the exhaust gas, it is necessary to increase the combustion efficiency, and therefore, the DPF system, turbo system, etc. are required to be set at a high temperature, whereby air hoses for diesel vehicles, DPF sensor hoses, etc. are required to have heat resistance higher than ever before.

Also in gasoline vehicles, downsizing of the engine capacity has been advanced in order to improve the fuel economy, and a method for mounting a turbocharger system has been widely adopted in order to compensate for the engine output reduction. The fluid (air) to be directed from the turbo charger to an intercooler or an engine is at a high temperature and under a high pressure. Therefore, an air hose to transport such high-temperature high-pressure fluid is also required to have higher heat resistance.

As an air hose for a diesel vehicle having a heat resistance, a hose made of a laminate having an inner layer and an outer layer containing an ethylene acrylic rubber, a fluorinated rubber, etc., is disclosed, for example, in Patent Document 1.

PRIOR ART DOCUMENT

Patent Document

Patent Document 1: JP-A-2007-230225

DISCLOSURE OF INVENTION

Technical Problem

However, the air hose disclosed in Patent Document 1 is one obtainable by molding a material composed mainly of rubber, whereby the productivity is low. That is, since the rubber has a high viscosity, it is necessary to reduce the extrusion rate during extrusion molding for the air hose. Further, rubber is generally expensive. Also, depending on the type of rubber, a vulcanization process may be required, whereby the number of process steps tends to increase.

Therefore, a study has been made to develop an air hose made of a laminate composed mainly of a resin which is at a lower price than the rubber, can be molded in a large extrusion speed, and requires no vulcanization process.

The air hose for transportation equipment such as automobiles, is required to have mechanical properties and flexibility to absorb vibration and pulsation in the vicinity of e.g. the engine, and to withstand shrinkage or expansion in a wide operation temperature range of from low to high temperatures. Further, it is required to have a resistance to engine oil or the like under high temperature conditions, so that even when contacted with engine oil or the like under high temperature conditions for a long period of time, it does not undergo interlayer peeling of the air hose made of the laminate.

An object of the present invention is to provide a laminate which is formed of a resin as the main component, is excellent in productivity without requiring a vulcanization process, is excellent in heat resistance and excellent in mechanical properties and flexibility under high temperature conditions, and will not undergo interlayer peeling even when contacted with an oil such as engine oil for a long period of time.

Solution to Problem

The present invention provides a laminate having the following constructions [1] to [13].

[1] A laminate comprising a first layer containing a fluorinated copolymer and a second layer containing a polyimide directly laminated on the first layer, wherein the fluorinated copolymer is a fluorinated copolymer having the following units (a1), the following units (a2), the following units (a3) and carbonyl group-containing groups, wherein the proportions of the respective units are as follows, and the tensile elongation at a 200° C. of the fluorinated copolymer is at least 200%, and the polyamide is a polyamide having a melting point of at least 220° C., and the flexural modulus at 23° C. of the second layer is at most 1,200 MPa, Units which the fluorinated copolymer has and their content proportions:

units (a1): units based on tetrafluoroethylene, units (a2): units based on ethylene, units (a3): units based on a monomer which is a copolymerizable monomer having no carbonyl group-containing group, and at least a portion of which is represented by $CH_2=CX(CF_2)_nY$ (wherein X and Y are each independently a hydrogen atom or a fluorine atom, and n is an integer from 2 to 8), the molar ratio of the units (a1) to the sum of the units (a1) and the units (a2): from 0.510 to 0.600, the molar ratio of the units (a3) to the sum of the units (a1) and the units (a2): from 0.005 to 0.030, the proportion of the total molar amount of the units (a1), the units (a2) and the units (a3) to the total molar amount of all units constituting the fluorinated copolymer: at least 90 mol %.

[2] The laminate according to [1], wherein the number of carbonyl group-containing groups in the fluorinated copolymer is from 10 to 60,000 to the number of $1 \times 10^6$ carbon atoms in the main chain of the fluorinated copolymer.

[3] The laminate according to [1] or [2], wherein the carbonyl-containing groups are at least one type selected from the group consisting of a group having a carbonyl group between carbon atoms of a hydrocarbon group, a carbonate group, a carboxy group, a haloformyl group, an alkoxycarbonyl group and an acid anhydride residue.

[4] The laminate according to any one of [1] to [3], wherein the carbonyl-containing groups are acid anhydride residues.

[5] The laminate according to any one of [1] to [4], wherein the fluorinated copolymer has the following units (a4), units (a4): units based on a monomer having a carbonyl group-containing group.

[6] The laminate according to [5], wherein the units (a4) are units based on a non-fluorinated monomer having an acid anhydride residue.

[7] The laminate according to any one of [1] to [6], wherein X is a hydrogen atom, Y is a fluorine atom, and n is from 4 to 8.

[8] The laminate according to any one of [1] to [7], wherein the second layer further contains an impact resistance improver.

[9] The laminate according to claim 8, wherein the content of the impact resistance improver in the second layer, is from 5 to 90 parts by mass to 100 parts by mass of the polyamide.

[10] The laminate according to any one of [1] to [9], wherein the tensile strength at 200° C. of the laminate is at least 2.0 MPa.

[11] The laminate according to any one of [1] to [10], wherein the tensile elongation at 200° C. of the laminate is at least 100%.

[12] The laminate according to any one of [1] to [11], which is a laminated hose.

[13] The laminate according to [12], which is an air hose for transportation equipment.

Advantageous Effects of Invention

The laminate of the present invention is formed of a resin as the main component, is excellent in productivity without requiring a vulcanization process, is excellent in heat resistance and excellent in mechanical properties and flexibility under high temperature conditions, and will not undergo interlayer peeling even when contacted with an oil such as engine oil for a long period of time.

DESCRIPTION OF EMBODIMENTS

In this specification, a "unit" means a moiety based on a monomer, formed by polymerization (including condensation polymerization) of the monomer. The unit may be a unit formed directly by a polymerization reaction, or may be a unit in which a part of the unit is converted to another structure by treating the polymer.

In this specification, a "polyamide unit" means a polyamide structure formed by polycondensation of a lactam, polycondensation of an amino acid, or condensation polymerization of a diamine and a dicarboxylic acid.

A "monomer" means a compound having a polymerizable unsaturated bond, i.e. a polymerization reactive carbon-carbon double bond. A "main chain" refers to a portion having the largest number of carbon atoms among carbon chains formed by polymerization of a monomer.

The laminate of the present invention comprises a first layer containing a fluorinated copolymer and a second layer containing a polyamide directly laminated on the first layer. The laminate of the present invention may have a layer other than the first and second layers.

[First Layer]

(Fluorinated Copolymer)

The fluorinated copolymer constituting the first layer has units (a1), units (a2), units (a3) and carbonyl group-containing groups.

Since the first layer contains the fluorinated copolymer, it has excellent acid resistance, oil resistance, flame retardancy, etc., based on the fluororesin. The content of the fluorinated copolymer in the first layer is preferably at least 50 mass %, more preferably at least 70 mass %, or may be 100 mass %.

Here, the fluorinated copolymer in the present invention will be hereinafter referred to also as a "copolymer (A)".

Since the copolymer (A) has units (a1), the first layer is excellent in corrosion resistance and impact resistance.

Since the copolymer (A) has units (a2), the first layer is excellent in mechanical properties such as tensile strength, tensile elongation, etc. and in moldability.

The monomer constituting units (a3) is a monomer which is a copolymerizable monomer having no carbonyl group-containing group, and at least a part of which is represented by $CH_2=CX(CF_2)_nY$ (wherein X and Y are each independently a hydrogen an atom or a fluorine atom, and n is an integer of from 2 to 8). The monomer constituting units (a3) may be constituted by the above monomer and a copolymerizable monomer having no carbonyl group-containing group other than the above monomer.

The molar amount of units based on $CH_2=CX(CF_2)_nY$ to the total molar amount of units (a3) is preferably at least 80 mol %, more preferably at least 90 mol %, particularly preferably 100 mol %.

By having units (a3) in addition to units (a1) and units (a2), it tends to be easy to obtain a copolymer (A) which has a high melting point and is excellent in mechanical properties such as tensile strength, tensile elongation, etc. under high temperature conditions, and in flexibility, and which has a tensile elongation at 200° C. of at least 200%. Further, by using such a copolymer (A), it becomes easy to obtain a laminate which is excellent in durability without undergoing interlayer peeling between the first layer and the after-mentioned second layer even if contacted with an oil component such as engine oil for a long period of time under high temperature conditions.

In $CH_2=CX(CF_2)_nY$, X is preferably a hydrogen atom from the viewpoint of polymerizability with tetrafluoroethylene (hereinafter referred to also as "TFE"). Y is preferably a fluorine atom from the viewpoint of long-term durability and chemical resistance.

n is preferably from 4 to 8, more preferably from 4 to 6. When n is within the above range, it tends to be easy to obtain a copolymer (A) which is excellent in the melting point, in the properties such as tensile strength, tensile elongation, flexibility, etc. under high temperature conditions, and in their balance. Further, it becomes easy to obtain a copolymer (A) which has a tensile elongation at 200° C. of at least 200%. Still further, by using such a copolymer (A), it tends to be easy to obtain a laminate which will not undergo interlayer peeling between the first layer and the after-mentioned second layer even when contacted with an oil component such as engine oil for a long period of time under high temperature conditions.

Specific examples of $CH_2=CX(CF_2)_nY$ include $CH_2=CHC_2F_5$, $CH_2=CHC_4F_9$, $CH_2=CHC_6F_{13}$, $CH_2=CHC_8F_{17}$, etc., and among them, $CH_2=CHC_4F_9$, $CH_2=CHC_6F_{13}$ or $CH_2=CHC_5F_{17}$, is preferred, and $CH_2=CHC_4F_9$ or $CH_2=CHC_6F_{13}$, is particularly preferred.

As $CH_2=CX(CF_2)_nY$, one type may be used alone, or two or more types may be used in combination.

Examples of the monomer other than the above essential monomer constituting units (a3) include the following fluorinated monomers (1) to (5) and the following non-fluorinated monomers (6).

(1) a fluoroolefin having no hydrogen atom in an unsaturated group, such as hexafluoropropylene (HFP) or chlorotrifluoroethylene (CTFE).

(2) a fluoroolefin having a hydrogen atom in an unsaturated group, such as vinylidene fluoride (VDF), vinyl fluoride (VF), trifluoroethylene or hexafluoroisobutylene.

(3) a perfluoro(alkyl vinyl ether) such as perfluoro(methyl vinyl ether), perfluoro(ethyl vinyl ether), perfluoro(propyl vinyl ether) or perfluoro(butyl vinyl ether).

(4) a perfluorovinyl ether having two unsaturated bonds such as $CF_2$=$CFOCF_2CF$=$CF_2$ or $CF_2$=$CFO(CF_2)_2CF$=$CF_2$.
(5) a fluorinated monomer having an alicyclic structure such as perfluoro(2,2-dimethyl-1,3-dioxole), 2,2,4-trifluoro-5-trifluoromethoxy-1,3-dioxole or perfluoro(2-methylene-4-methyl-1,3-dioxolane).
(6) an olefin such as propylene, butene or isobutylene.

Based on the total molar amount of all units constituting the copolymer (A), the total molar amount of units (a1), units (a2) and units (a3) is at least 90 mol %, preferably at least 95 mol %, more preferably at least 98 mol %, particularly preferably at least 99 mol %. When the total molar amount is at least the above lower limit, the copolymer (A) is excellent in thermal stability, processability, etc.

The total molar amount may be 100 mol %. When the total molar amount is 100 mol %, the copolymer (A) has no units based on a monomer having a later-described carbonyl group-containing group and has a later-described carbonyl group-containing group as a main chain terminal group.

The carbonyl group-containing group is a group containing a carbonyl group (—C(=O)—) in its structure and has adhesive properties. As the copolymer (A) has carbonyl group-containing groups, the first and second layers may be laminated directly without via another adhesive layer or the like.

The carbonyl group-containing group may, for example, be a group having a carbonyl group between carbon atoms of a hydrocarbon group, a carbonate group, a carboxy group, a haloformyl group, an alkoxycarbonyl group or an acid anhydride residue.

The hydrocarbon group in the above group having a carbonyl group between carbon atoms of a hydrocarbon group may, for example, be an alkylene group having from 2 to 8 carbon atoms. The number of carbon atoms in the alkylene group is the number of carbon atoms in such a state that does not contain a carbonyl group. The alkylene group may be linear or branched.

The haloformyl group may be represented by —C(=O)—$X^1$ (wherein $X^1$ is a halogen atom). The halogen atom in the haloformyl group may, for example, be a fluorine atom, a chlorine atom, etc., and from the viewpoint of reactivity with other substrates, a fluorine atom is preferred. That is, the haloformyl group is preferably a fluoroformyl group (referred to also as a carbonyl fluoride group).

The alkoxy group in the alkoxycarbonyl group may be linear or branched, and from the viewpoint of reactivity with other substrates, an alkoxy group having from 1 to 8 carbon atoms is preferred, and a methoxy group or an ethoxy group is particularly preferred.

The number of carbonyl group-containing groups in the copolymer (A) is preferably from 10 to 60,000, more preferably from 100 to 50,000, further preferably from 100 to 10,000, particularly preferably from 300 to 5,000, to the number of $1\times10^6$ carbon atoms in the main chain of the copolymer (A).

When the number of the carbonyl group-containing groups is at least the lower limit value in the above range, it tends to be easy to obtain a laminate in which adhesion between the first layer containing the copolymer (A) and the later-described second layer is superior and which will not undergo interlayer peeling between the first layer and the second layer even if contacted with an oil component such as engine oil under high temperature conditions for a long period of time. When it is at most the upper limit value in the above range, the copolymer (A) will be excellent in the thermal stability, processability, etc.

The number of carbonyl group-containing groups can be measured by a method such as a nuclear magnetic resonance (NMR) analysis, an infrared absorption spectrum analysis, etc. For example, using a method such as an infrared absorption spectroscopy as described in JP-A-2007-314720, the proportion (mol %) of units having carbonyl group-containing groups in all units constituting the copolymer (A) is obtained, and from the proportion, it is possible to calculate the number of carbonyl group-containing groups.

Carbonyl group-containing groups can be introduced into the copolymer (A) by the following methods (1) to (4).

(1) A method of using a monomer having a carbonyl group-containing group at the time of producing a copolymer (A) by a polymerization reaction. By this method, a copolymer (A) having units (i.e. units (a4)) based on a monomer having a carbonyl group-containing group is obtainable.

(2) A method of using at least one of a radical polymerization initiator having a carbonyl group-containing group and a chain transfer agent having a carbonyl group-containing group at the time of producing a copolymer (A) by a polymerization reaction. By this method, a copolymer (A) provided with a main chain terminal group having a carbonyl group-containing group is obtainable.

(3) A method for forming carbonyl-containing groups by heating a fluorinated copolymer having thermally decomposable moieties to form carbonyl group-containing groups by thermal decomposition, to partially thermally decompose the fluorinated copolymer.

(4) A method of graft-polymerizing a monomer having a carbonyl group-containing group, to a fluorinated copolymer having no carbonyl group-containing group, thereby to introduce carbonyl group-containing groups to the fluorinated copolymer.

Among them, the copolymer (A) is preferably one having units (a4) obtainable by the above method (1), from the viewpoint of excellent thermal stability.

The carbonyl group-containing groups are preferably acid anhydride residues. In this case, the copolymer (A) is preferably a copolymer having units (a4) in addition to the above units (a1), units (a2) and units (a3). In particular, as the units (a4), units based on a non-fluorinated monomer having an acid anhydride residue are preferred.

The above-mentioned non-fluorinated monomer having an acid anhydride residue, may, for example, be itaconic anhydride (hereinafter referred to also as "IAH"), 5-norbornene-2,3-dicarboxylic anhydride (hereinafter referred to also as "NAH"), citraconic anhydride (hereinafter referred to also as "CAH"), etc. As the non-fluorinated monomer having an acid anhydride residue, one type may be used alone or two or more types may be used in combination.

In the case of units based on at least one member selected from the group consisting of IAH, NAH and CAH, it is possible to easily produce a copolymer (A) containing units (a4) without using a special polymerization method as is required in the conventional case of using maleic anhydride as described in JP-A-11-193312.

Among them, from the viewpoint of excellent polymerizability, as the units (a4), units based on IAH are preferred.

The molar ratio of units (a1) to the sum of units (a1) and units (a2) is from 0.510 to 0.600, preferably from 0.520 to 0.580, more preferably from 0.530 to 0.560. When the molar ratio is at least the above lower limit value, the tensile strength of the copolymer (A) is excellent, and when it is at most the above upper limit value, the heat resistance of the copolymer (A) is excellent.

Hereinafter, the "molar ratio of units (a1) to the sum of units (a1) and units (a2)" will be represented by a "molar ratio [(a1)/{(a1)+(a2)}]".

The molar ratio of units (a3) to the sum of units (a1) and units (a2) is from 0.005 to 0.030, preferably from 0.005 to 0.025, more preferably from 0.007 to 0.020, most preferably from 0.010 to 0.020. When the molar ratio is within the above range, it tends to be easy to obtain a copolymer (A) which has a high melting point and is excellent in the mechanical properties of tensile strength and tensile elongation, and in the flexibility, under high temperature conditions. Further, it becomes easy to obtain a laminate which will not undergo interlayer peeling between the first layer and the second layer even if contacted with an oil component such as engine oil for a long period of time under high temperature conditions. When the molar ratio is at least the above lower limit value, it tends to be easy to obtain a copolymer (A) particularly excellent in tensile elongation under high temperature conditions, and when it is at most the above upper limit value, it tends to be easy to obtain a copolymer (A) having a sufficiently high melting point.

Hereinafter, the "molar ratio of units (a3) to the sum of units (a1) and units (a2)" will be represented by a "molar ratio [(a3)/{(a1)+(a2)}]".

In a case where a copolymer (A) contains units (a4), the molar ratio of units (a4) to the sum of units (a1) and units (a2), is preferably from 0.0001 to 0.010, more preferably from 0.0005 to 0.030, most preferably from 0.001 to 0.020. When the molar ratio is at least the above lower limit value, it tends to be easy to obtain a laminate in which adhesion between the first layer containing the copolymer (A) and the later-described second layer will be superior, and which will not undergo interlayer peeling between the first layer and the second layer even if contacted with an oil component such as engine oil for a long period of time under high temperature conditions. When it is at most the above upper limit value, the copolymer (A) will be excellent in thermal stability, processability, etc.

Hereinafter, the "molar ratio of units (a4) to the sum of units (a1) and units (a2)" will be represented by a "molar ratio [(a4)/{(a1)+(a2)}]".

The melting point of the copolymer (A) is preferably at least 220° C., more preferably at least 240° C., particularly preferably at least 250° C. When the melting point is at least the lower limit value, the copolymer (A) and the first layer containing the copolymer (A) will be excellent in heat resistance. The melting point of the copolymer (A) is preferably at most 300° C., more preferably at most 280° C., particularly preferably at most 270° C., from the viewpoint of e.g. co-extrusion moldability with other materials. Here, in this specification, the melting point and the crystallization temperature are values by the measurements shown in Examples.

The crystallization temperature of the copolymer (A) is preferably at least 220° C., more preferably at least 230° C., particularly preferably at least 240° C. When the crystallization temperature is at least the lower limit value, the copolymer (A) and the first layer containing the copolymer (A) will be excellent in heat resistance. The crystallization temperature of the copolymer (A) is preferably at most 290° C., more preferably at most 270° C., particularly preferably at most 260° C., from the viewpoint of e.g. co-extrusion moldability with other materials.

In a case where the above molar ratio [(a1)/{(a1)+(a2)}] and molar ratio [(a3)/{(a1)+(a2)}] of the copolymer (A) and the total molar amount of units (a1), units (a2) and units (a3) to the total molar amount of all units constituting the copolymer (A), are, respectively, within the above-described ranges, the melting point and crystallization temperature of the copolymer (A) are usually within the above ranges.

The melting point and crystallization temperature of the copolymer (A) can be adjusted by e.g. the types and content proportions of the above-described respective units constituting the copolymer (A), the molecular weight, etc.

The volume flow rate (hereinafter referred to also as the "Q value") of the copolymer (A) is preferably at least 3 $mm^3$/sec, more preferably at least 5 $mm^3$/sec, particularly preferably at least 8 $mm^3$/sec. It is preferably at most 30 $mm^3$/sec, more preferably at most 20 $mm^3$/sec, particularly preferably at most 15 $mm^3$/sec.

The Q value is an index representing the melt flowability of the fluorinated copolymer and is a measure of the molecular weight. The Q value being large indicates that the molecular weight is low, and it being small indicates that the molecular weight is high.

When the Q value is at least the above lower limit value, the copolymer (A) is excellent in moldability and is melt-moldable. When it is at most the above upper limit value, the copolymer (A) is excellent in mechanical properties.

In this specification, the Q value is a value by the measurement shown in Examples.

The 10% weight loss point of the copolymer (A) is preferably at least 400° C., more preferably at least 430° C., particularly preferably at least 450° C. The 10% weight loss point is an index for oxidation degradation of the material at a high temperature. The 10% weight loss point being high indicates that the high-temperature properties are excellent and the molding stability is also good, and the 10% weight loss point being low indicates that a defect is likely to occur in the polymer backbone and the mechanical properties tend to be low.

In this specification, the 10% weight loss point is a value by the measurement shown in Examples.

The tensile strength at 200° C. of the copolymer (A) is preferably at least 3 MPa, more preferably at least 3.5 MPa, particularly preferably at least 4.5 MPa. When the tensile strength at 200° C. of the copolymer (A) is at least the above lower limit value, even if the laminate is a hose for transportation equipment such as an air hose for an automobile, and a high-temperature high-pressure fluid flows therethrough, it is durable against the pressure of the fluid. The upper limit for the tensile strength at 200° C. of the copolymer (A) is not particularly limited, but it is usually at most 15 MPa.

The tensile elongation at 200° C. of the copolymer (A) is at least 200%. The tensile elongation at 200° C. of the copolymer (A) is preferably at least 300%, particularly preferably at least 400%. When the tensile elongation at 200° C. of the copolymer (A) is at least the above lower limit value, even if the laminate is a hose for transportation equipment such as an air hose for an automobile and is disposed near the engine, it is capable of absorbing vibration or pulsation, and is durable against shrinkage or expansion in a wide operation temperature range of from low to high temperatures.

The upper limit for the tensile elongation at 200° C. of the copolymer (A) is not particularly limited, but it is usually at most 800%.

Further, the tensile elongation of the copolymer (A) is preferably at least 200% at 220° C., most preferably at least 100% at 240° C.

In a case where the above molar ratio [(a1)/{(a1)+(a2)}] and molar ratio [(a3)/{(a1)+(a2)}] of the copolymer (A) and the total molar amount of units (a1), units (a2) and units (a3)

to the total molar amount of all units constituting the copolymer (A), are, respectively, within the above-described ranges, the tensile elongation at 200° C. of the copolymer (A) is usually within the above range. In a case where n in $CH_2=CX(CF_2)_nY$ constituting units (a3) is small, for example, n=2, there may be a case where the tensile elongation at 200° C. of the copolymer (A) becomes less than 200%. In such a case, by e.g. increasing the above-mentioned molar ratio [(a3)/{(a1)+(a2)}], the tensile elongation at a high temperature of the copolymer (A) tends to be improved, and the tensile elongation at 200° C. is likely to be within the above range.

The storage elastic modulus at 60° C. of the copolymer (A) is preferably at most 1,200 MPa, more preferably at most 1,000 MPa, particularly preferably at most 800 MPa. Further, the storage elastic modulus at 200° C. of the copolymer (A) is preferably at most 80 MPa, more preferably at most 70 MPa, particularly preferably at most 60 MPa. When the storage elastic moduli at 60° C. and 200° C. of the copolymer (A) are, respectively, at most the above-described upper limit values, the copolymer is excellent in flexibility over a wide operating temperature range from low to high temperatures, and is durable against shrinkage or expansion caused by temperature changes. The storage elastic modulus at 60° C. is preferably at least 300 MPa, more preferably at least 400 MPa, particularly preferably at least 500 MPa. The storage elastic modulus at 200° C. is preferably at least 20 MPa, more preferably at least 30 MPa, particularly preferably at least 40 MPa. When the storage elastic moduli at 60° C. and 200° C. of the copolymer (A) are, respectively, at least the above lower limit values, the rigidity durable against temperature changes over a wide operating temperature range from low to high temperatures will be maintained.

The polymerization method at the time of producing the copolymer (A) is not particularly limited, and may, for example, be a known polymerization method using a radical polymerization initiator and a chain transfer agent.

As the radical polymerization initiator, the temperature for its half-life being 10 hours, is preferably from 0 to 100° C., more preferably from 20 to 90° C. Specific examples include azo compounds such as azobisisobutyronitrile, etc., non-fluorinated diacyl peroxides such as isobutyryl peroxide, octanoyl peroxide, benzoyl peroxide, lauroyl peroxide, etc., peroxydicarbonates such as diisopropyl peroxydicarbonate, etc., peroxy esters such as tert-butyl peroxypivalate, tert-butyl peroxyisobutyrate, tert-butylperoxy acetate, etc., fluorinated diacyl peroxides such as compounds represented by $(Z(CF_2)_rCOO)_2$ (wherein Z is a hydrogen atom, a fluorine atom or a chlorine atom, and r is an integer of from 1 to 10), inorganic peroxides such as potassium persulfate, sodium persulfate, ammonium persulfate, etc.

By using an initiator having a carbonyl group-containing group as the radical polymerization initiator, it is possible to introduce a carbonyl group-containing group as a main chain terminal group to the copolymer (A). Such a radical polymerization initiator may, for example, be di-n-propyl peroxydicarbonate, diisopropyl peroxycarbonate, t-butyl peroxyisopropyl carbonate, bis(4-t-butylcyclohexyl) peroxydicarbonate, di-2-ethylhexyl peroxydicarbonate, etc.

The chain transfer agent may, for example, be an alcohol such as methanol, ethanol, etc., a chlorofluorohydrocarbon such as 1,3-dichloro-1,1,2,2,3-pentafluoropropane, 1,1-dichloro-1-fluoroethane, etc., or a hydrocarbon such as pentane, hexane, cyclohexane, etc.

By using a chain transfer agent having a carbonyl group-containing group as the chain transfer agent, it is possible to introduce a carbonyl group-containing group as a main chain terminal group to the copolymer (A). Such a chain transfer agent may, for example, be acetic acid, acetic anhydride, methyl acetate, etc.

The polymerization method may, for example, be bulk polymerization, solution polymerization using an organic solvent such as a fluorinated hydrocarbon, a chlorinated hydrocarbon, a fluorinated and chlorinated hydrocarbon, an alcohol or a hydrocarbon, suspension polymerization using an aqueous medium and, if necessary, a suitable organic solvent, emulsion polymerization using an aqueous medium and an emulsifier, etc. Preferred is solution polymerization.

The polymerization conditions are not particularly limited, and the polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours.

(Other Components)

The first layer may contain other components, such as a resin other than the copolymer (A) and additives, within a range not to impair the effects of the present invention.

The resin other than the copolymer (A) may, for example, be a later-described polyamide (B), a fluororesin other than the copolymer (A), a polyamide resin other than the later-described polyamide (B), a later-described impact resistance improver, a resin other than the fluororesin and polyamide resin, etc. Hereinafter, resins other than the fluororesin, the polyamide resin and the later-described impact resistance improver may be referred to also as "other resins".

The fluororesin other than the copolymer (A) may, for example, be, as a fluorinated polymer other than the copolymer (A), a polyvinylidene fluoride (PVDF), a polyvinyl fluoride (PVF), a polychlorofluoroethylene (PCTFE), an ethylene/chlorotrifluoroethylene copolymer (ECTFE), a TFE/hexafluoropropylene copolymer (FEP), a TFE/hexafluoropropylene/vinylidene fluoride copolymer (THV), a TFE/fluoro(alkyl vinyl ether) copolymer (PFA), etc.

The polyamide (B) may, for example, be a polyamide exemplified as the later-described polyamide (B). The polyamide resin other than the polyamide (B) may, for example, be a polyamide exemplified as the polyamide other than the later-described polyamide (B). The impact resistance improver may, for example, be a resin mentioned as the later-described impact resistance improver.

Other resins include polyolefin resins such as high density polyethylene (HDPE), medium density polyethylene (MDPE), low density polyethylene (LDPE), linear low density polyethylene (LLDPE), ultra high molecular weight polyethylene (UHMWPE), polypropylene (PP), an ethylene/propylene copolymer (EPR), an ethylene/butene copolymer (EBR), an ethylene/vinyl acetate copolymer (EVA), an ethylene/vinyl acetate copolymer saponified product (EVOH), an ethylene/acrylic acid copolymer (EAA), an ethylene/methacrylic acid copolymer (EMAA), an ethylene/methyl acrylate copolymer (EMA), an ethylene/methyl methacrylate copolymer (EMMA), an ethylene/ethyl acrylate copolymer (EEA), etc., and such polyolefin resins containing a functional group such as a carboxy group and its salt, an acid anhydride group, an epoxy group, etc., polyether resins such as polybutylene terephthalate (PBT), polyethylene terephthalate (PET), polyethylene isophthalate (PEI), a PET/PEI copolymer, a polyarylate (PAR), polyethylene naphthalate (PEN), polybutylene naphthalate (PBN), liquid crystal polyester (LCP), etc., polyether resins such as polyacetal (POM), polyphenylene oxide (PPO), etc., polysulfone resins such as polysulfone (PSF), polyether sulfone (PES), etc., polythioether resins such as polyphenylene sulfide (PPS), polythioether sulfone (PTES), etc., polyketone resins such as polyether ether ketone (PEEK), polyallyl ether ketone (PAEK), etc., polynitrile resins such as polyacrylonitrile (PAN), polymethacrylonitrile, an acrylonitrile/styrene copolymer (AS), a methacrylonitrile/styrene copolymer, an acrylonitrile/butadiene/styrene copolymer (ABS), a methacrylonitrile/styrene/butadiene copolymer (MBS), etc., polymethacrylate resins such as polymethyl methacrylate (PMMA), polyethyl methacrylate (PEMA), etc., polyvinyl resins such as polyvinyl alcohol (PVA), polyvinylidene chloride (PVDC), polyvinyl chloride (PVC), a vinyl chloride/vinylidene chloride copolymer, a vinylidene chloride/methyl acrylate copolymer, etc., cellulose resins such as cellulose acetate, cellulose butyrate, etc.

As the resin other than the copolymer (A), one type may be used alone, or two or more types may be used in combination.

The first layer may contain, depending on the purpose and application, within a range not to impair its performance, additives such as various fillers including inorganic powder, glass fiber, carbon fiber, metal oxides, carbon, etc.; a pigment; an UV absorber; a heat stabilizer; a conductive material; etc. One of such additives may be used alone, or two or more of them may be used in combination.

The heat stabilizer may, for example, be a copper compound, a tin compound, an iron compound, a lead compound, a titanium compound, an aluminum compound, etc., and copper oxide, copper iodide, alumina, tin sulfate, germanium sulfate, basic lead sulfate, tin sulfite, barium phosphate, tin pyrophosphate or the like is preferred, and copper oxide or copper iodide is more preferred. The content of the heat stabilizer is preferably from $1 \times 10^{-8}$ to 5 mass %, more preferably from $1 \times 10^{-7}$ to 2 mass %, particularly preferably from $5 \times 10^{-7}$ to 1 mass %, to the first layer.

The conductive material may, for example, be carbon black, acetylene black, etc. When a conductive material is contained, in a case where the laminate is a tube or hose for fuel piping, it is advantageous to prevent electrostatic charge accumulation.

In a case where the first layer contains other components such as additives, resins other than the copolymer (A), etc., the total content of such other components is preferably such that the content of the copolymer (A) in the first layer would be at least the above-mentioned lower limit value.

[Second Layer]

The second layer contains a polyamide having a melting point of at least 220° C. and has a flexural modulus at 23° C. of at most 1,200 MPa. The second layer may contain, depending on the type of the polyamide to be contained, a later-described impact resistance improver, to control the flexural modulus at 23° C. to be at most 1,200 MPa.

Hereinafter, a polyamide having a melting point of at least 220° C. will be referred to also as a "polyamide (B)".

The second layer contains a polyamide (B) and thus has excellent mechanical properties, heat resistance, etc. based on the polyamide. In the second layer, the content of the later-described impact resistance improver to be used as the case requires, can be adjusted to such a level that, as described below, the flexural modulus of the second layer will be in a proper range. Specifically, the content of the impact resistance improver is preferably at least 5 parts by mass, more preferably at least 20 parts by mass, most preferably at least 30 parts by mass, to 100 parts by mass of the polyamide (B). The content of the impact resistance improver is preferably at most 90 parts by mass, more preferably at most 60 parts by mass, particularly preferably at most 50 parts by mass. When it is at least the lower limit value in the above range, the flexibility will be excellent, and when it is at most the upper limit value, the heat resistance will be excellent. In the second layer, the total content of the polyamide (B) and the impact resistance improver to be used as the case requires, is, from the viewpoint of heat resistance, preferably at least 60 mass %, more preferably at least 70 mass %, further preferably at least 80 mass %, most preferably at least 90 mass %, based on the second layer.

The flexural modulus at 23° C. of the second layer is preferably at most 1,100 MPa, more preferably at most 1,000 MPa, most preferably at most 900 MPa. When the flexural modulus at 23° C. of the second layer is at most the above upper limit value, the flexibility will be excellent, such being suitable for an application to a hose such as an air hose for an automobile. Further, when the flexural modulus at 23° C. of the second layer is at most the above upper limit value, the flexural modulus at high temperatures is sufficiently low, whereby the flexibility at high temperatures will be excellent. Therefore, the flexibility will be excellent over a wide operating temperature range of from low to high temperatures, so as to be durable against shrinkage or expansion due to temperature changes.

The flexural modulus at 23° C. of the second layer is, from the viewpoint of rigidity of the hose, preferably at least 100 MPa, more preferably at least 200 MPa, particularly preferably at least 300 MPa.

In this specification, the flexural modulus is a value measured at 23° C. by the method in accordance with ASTM D790.

The tensile strength at 200° C. of the second layer is preferably at least 1 MPa, more preferably at least 1.5 MPa, particularly preferably at least 2 MPa. When the tensile strength at 200° C. of the second layer is at least the above lower limit value, even in a case where the laminate is a hose for transportation equipment such as an air hose for automobiles, and a high-temperature high-pressure fluid flows inside, it is durable against the pressure of the fluid. The upper limit value for the tensile strength at 200° C. of the second layer is not particularly limited, but it is usually at most 100 MPa.

The tensile elongation at 200° C. of the second layer is preferably at least 5%, more preferably at least 10%, particularly preferably at least 20%. When the tensile elongation at 200° C. of the second layer is at least the above lower limit value, even in a case where the laminate is a hose for transportation equipment such as an air hose for an automobile and is disposed near the engine, it is capable of absorbing vibration or pulsation, and is durable against shrinkage or expansion in a wide operating temperature range of from low to high temperatures. The upper limit value for the tensile elongation at 200° C. of the second layer is not particularly limited, but it is usually at most 800%.

(Polyamide (B))

As the polyamide (B) constituting the second layer, it is possible to use a known polyamide having a melting point of at least 220° C. The melting point of the polyamide (B) is preferably at least 240° C., more preferably at least 250° C. When the melting point is at least the lower limit value, the polyamide (B) and the second layer containing the polyamide (B) are excellent in heat resistance. The melting point of the polyamide (B) is, from the viewpoint of co-extrusion moldability with other materials, preferably at most 320° C., more preferably at most 300° C.

As the polyamide, one type may be used alone, or two or more types may be used in combination.

The polyamide (B) having a melting point of at least 220° C. may, for example, be PA6 (polycaprolactam), PA46 (polytetramethylene adipamide), PA66 (polyhexamethylene adipamide), PA69 (polyhexamethylene azepamide), PA610 (polyhexamethylenesebacamide), PA6T (polyhexamethylene terephthalamide), PA6I (polyhexamethylene isophthalamide), PA912 (polynonamethylene dodecamide), PA9T (polynonamethylene terephthalamide), PA9I (polynonamethylene isophthalamide), PA10T (polydecamethylene terephthalamide), PA10I (polydecamethylene isophthalamide), PA11T (polyundecamethylene terephthalamide), PA11I (polyundecamethylene isophthalate), PA12T (polydodecamethylene terephthalamide), PA12I (polydodecamethylene isophthalamide), polyamide MXD6 (poly-m-xylylene adipamide), etc.

As the polyamide (B) having a melting point of at least 220° C., a copolyamide may also be used.

The copolyamide may, for example, be a polyamide (hereinafter referred to also as a "polyamide (B1)") which is a polyamide having the following units (b1) and units (b2), wherein the total molar amount of units (b1) and units (b2) to the total molar amount of all units constituting the polyamide, is at least 80 mol %. The total molar amount is preferably at least 90 mol %. The polyamide (B1) may contain the later-described units (b3) other than the units (b1) and the units (b2), in a range of at most 20 mol %. The content of units (b3) is preferably at most 10 mol %.

Units (b1): semi-aromatic units of at least one type, composed of units of at least one type derived from an aromatic dicarboxylic acid and units of at least one type derived from a $C_{9-13}$ aliphatic diamine.

Units (b2): aliphatic units of at least one type having from 8 to 13 carbon atoms per one nitrogen atom.

Here, the aliphatic is meant for a linear or branched, saturated or unsaturated non-cyclic hydrocarbon. The aliphatic in the units (b2) shall not include a cyclic hydrocarbon.

<Units (b1)>

The aromatic dicarboxylic acid may, for example, be terephthalic acid (represented by "T" in the composition of the polyamide), isophthalic acid (represented by "I" in the composition of the polyamide), naphthalene acid, etc. As the aromatic dicarboxylic acid, one type may be used alone, or two or more types may be used in combination. In the composition of the polyamide, terephthalic acid is denoted by "T", and isophthalic acid is denoted by "I".

The aliphatic diamine may, for example, be nonanediamine (denoted by "9" in the composition of the polyamide, based on the number of carbon atoms "9", the same applies to other compounds), 2-methyl-18-nonanediamine, decane diamine ("10"), undecane diamine ("11"), dodecane diamine ("12"), tridecane diamine ("13"), etc. 2-methyl-18-nonanediamine is denoted by "9'".

The units (b1) may, for example, be "9T", "9'T" and "10T". The units (b1) may have one type of them alone, or may have two or more types of them. As an example of the case having two types of them, a combination of the "9T" and "9'T", i.e. "9T/9'T", may be mentioned.

Among them, the units (b1) preferably have "10T".

In the units (b1), when the aromatic dicarboxylic acid in the units derived from an aromatic dicarboxylic acid is terephthalic acid, the units (b1) have high crystallinity, and the melting point of the polyamide having such units (b1) tends to be high. The aromatic dicarboxylic acid is preferably terephthalic acid only.

The molar amount of the units (b1) is preferably from 40 to 75 mol %, based on the total molar amount of all units constituting the polyamide.

<Units (b2)>

The units (b2) have from 8 to 13 carbon atoms per one nitrogen atom. The units (b2) preferably have from 9 to 13 carbon atoms per one nitrogen atom. Specifically, the units (b2) are derived from condensation polymerization of a lactam, or condensation polymerization of an amino acid, or condensation polymerization of a diamine and a dicarboxylic acid. In a case where the units (b2) have a plurality of units different in the number of carbon atoms per one nitrogen atom, the number of carbon atoms per one nitrogen atom in the units (b2) employs a molar average value.

Also in a copolyamide, the number of carbon atoms per one nitrogen atom is calculated according to the same principles as the polyamide. That is, it is calculated in molar ratio of the respective amide units.

The lactam, amino acid, aliphatic diamine and aliphatic dicarboxylic acid to constitute the units (b2) are selected so that the number of carbon atoms per one nitrogen atom in the units derived therefrom would be in the above-mentioned range.

In a case where the units (b2) are derived from condensation polymerization of a lactam, as the lactam, caprolactam ("6"), enantholactam ("7"), pelargonic lactam ("9"), decanolactam ("10"), undekano lactam ("11") and laurolactam ("12") may be mentioned. As the lactam, one type may be used alone, or two or more types may be used in combination.

In a case where the units (b2) are derived from condensation polymerization of an amino acid, as the amino acid, 9-aminononanoic acid, 10-aminodecanoic acid, 12-aminododecanoic acid, 11-aminoundecanoic acid and derivatives thereof, and N-heptyl-11-amiundecanoic acid, may be mentioned. As the amino acid, one type may be used alone, or two or more types may be used in combination.

In a case where the units (b2) are derived from condensation polymerization of an aliphatic diamine and an aliphatic dicarboxylic acid, as the aliphatic diamine, butanediamine ("4"), pentanediamine ("5"), hexanediamine ("6"), heptane diamine ("7"), octane diamine ("8"), nonanediamine ("9"), 2-methyl-18-nonanediamine ("9'"), decane diamine ("10"), undecane diamine ("11"), dodecane diamine ("12"), tridecane diamine ("13"), tetradecane diamine ("14"), hexadecane diamine ("16"), octadecane diamine ("18"), octadecene diamine ("18"), eicosane diamine ("20"), docosanoic diamine ("22") and various diamines obtainable from fatty acids, may be mentioned. As the aliphatic diamine, one type may be used alone, or two or more types may be used in combination.

As the aliphatic diamine, preferred is octane diamine ("8"), nonanediamine ("9"), 2-methyl-1,8-nonanediamine ("9'"), decane diamine ("10"), undecane diamine ("11"), dodecane diamine ("12") or tridecane diamine ("13").

As the aliphatic dicarboxylic acid, succinic acid ("4")), pentanedioic acid ("5"), adipic acid ("6"), heptanedioic acid ("7"), octanedioic acid ("8"), azelainedioic acid ("9"), sebacic acid ("10"), undecanedioic acid ("11"), dodecanedioic acid ("12"), brassyldioic acid ("13"), tetradecanedioic acid ("14"), hexanedioic acid ("16"), octadecadioic acid ("18"), octadecenedioic acid ("18"), eicosadioic acid ("20"), docosadioic acid ("22") and a dimer of a fatty acid may be mentioned.

As the aliphatic dicarboxylic acid, preferred is octanedioic acid ("8"), azelainedioic acid ("9"), sebacic acid ("10"), undecanedioic acid ("11"), dodecanedioic acid ("12") or brassyldioic acid ("13").

The dimer of a fatty acid may, for example, be obtained by oligomerization or polymerization of an unsaturated monobasic fatty acid (e.g. linoleic acid) having a long chain hydrocarbon, as described in European Patent No. 0471566.

The aliphatic diamine is preferably at least one member selected from the group consisting of nonanediamine ("9"), 2-methyl-18-nonanediamine ("9'"), decane diamine ("10"), undecane diamine ("11"), dodecane diamine ("12") and tridecane diamine ("13"), and the aliphatic dicarboxylic acid is preferably at least one member selected from the group consisting of azelaic acid ("9"), sebacic acid ("10"), undecanedioic acid ("11"), dodecanedioic acid ("12") and brassylic acid ("13").

The units (b2) are preferably straight chained. The units (b2) are preferably selected from among "12", "11", "1010", "1012", "1212", "614" and "612". Among them, "12", "1010", "1012" and "1212" are preferred.

The molar amount of the units (b2) is preferably from 5 to 20 mol % based on the total molar amount of all polyamide units constituting the polyamide.

The molar ratio of polyamide units (b1) to the unit (b2) (hereinafter represented by (b1)/(b2)) Is preferably from 1 to 3, more preferably from 1.5 to 2.5.

<Units (b3)>

The polyamide (B1) may contain units (b3). Units (b3) are polyamide units other than the units (b1) and the units (b2).

The units (b3) may comprise semi-aromatic units of at least one type formed by units derived from an aromatic dicarboxylic acid and units derived from a diamine. The number of carbon atoms in the diamine used here is from 4 to 8, or at least 14.

The units (b3) may also be aliphatic units of at least one type wherein the number of carbon atoms per one nitrogen atom is from 4 to 7, or at least 14.

In a case where the units (b3) are alicyclic units derived from condensation polymerization of a dicarboxylic acid and a diamine, as one of these two compounds, an alicyclic compound may be employed.

As an alicyclic diamine, a bis(3,5-dialkyl-4-aminocyclohexyl) methane, a bis(3,5-dialkyl-4-aminocyclohexyl), a bis (3,5-dialkyl-4-aminocyclohexyl) propane, a bis(3,5-dialkyl-4-aminocyclohexyl) butane, a bis-(3-methyl-4-aminocyclohexyl)-methane (BMACM or MACM), p-bis (aminocyclohexyl) methane (PACM) or isopropylidene di(cyclohexylamine) (PACP) may be mentioned. Further, one having a carbon skeleton consisting of norbornyl methane, cyclohexyl methane, dicyclohexyl propane, di(methylcyclohexyl) or di(methylcyclohexyl) propane, may also be mentioned. As the alicyclic diamine, one type may be used alone, or two or more types may be used in combination.

These alicyclic diamines are exemplified in "Cycloaliphatic Amines" (Encyclopaedia of Chemical Technology, Kirk-Othmer, 4th Edition (1992), pp. 386-405). However, the alicyclic diamine is not limited to those exemplified in the document.

In a case where the above-mentioned alicyclic diamine is to be used, as the dicarboxylic acid, it is possible to use the above-mentioned straight or branched chain aliphatic, alicyclic or aromatic dicarboxylic acid.

The alicyclic dicarboxylic acid may be one having a carbon skeleton consisting of norbornyl methane, cyclohexyl methane, dicyclohexylmethane, dicyclohexyl propane, di(methylcyclohexyl) or di(methylcyclohexyl) propane. As the alicyclic dicarboxylic acid, one type may be used alone, or two or more types may be used in combination.

In a case where the above alicyclic dicarboxylic acid is to be used, as the diamine, it is possible to use the above-mentioned straight or branched chain aliphatic, alicyclic or aromatic diamine.

The polyamide (B1) is preferably one composed of the following respective polyamide units.
(1) from 40 to 75 mol % of polyamide units (b1) of one or more types,
(2) from 20 to 50 mol % of polyamide units (b2) of one or more types,
(3) from 0 to 20 mol % of polyamide units (b3) of one or more types other than the above polyamide units (b1) and polyamide units (b2).

The polyamide (B1) is more preferably one composed of the following respective polyamide units.
(1) from 50 to 75 mol % of polyamide units (b1) of one or more types,
(2) from 25 to 50 mol % of polyamide units (b2) of one or more types.

The polyamide (B1) is particularly preferably "PA12/9T", "PA612/10T", "PA1010/10T", "PA1010/10T/6T", "PA1010/10T/10I" or "PA1012/10T". The melting enthalpy of the polyamide (B1) is preferably at least 10 J/g, more preferably at least 25 J/g.

In this specification, the melting enthalpy is measured by DSC in accordance with ISO 11357 standard. Specifically, the polyamide is first heated to a temperature of 340° C. at a rate of 20° C./min., and then cooled to a temperature of 20° C. at a rate of 20° C./min., and further heating of the second round is conducted to a temperature of 340° C. at a rate of 20° C./min. The melting enthalpy is measured during the heating of this second round.

The content of terminal amino groups in the polyamide (B1) is preferably at least 40 µeq/g, more preferably from 42 to 100 µeq/g, particularly preferably from 45 to 70 µeq/g.

In this specification, the content of terminal amino groups can be measured by a conventional method by potentiometry known to those skilled in the art.

As the polyamide (B) to be used for the second layer, it is possible to use one prepared by a known method for producing a polyamide. Otherwise, a commercially available product may be used.

(Other Components)

As mentioned above, depending on the type of the polyamide (B) to be used for the second layer, by incorporating an impact resistance improver, the flexural modulus at 23° C. of the second layer may be controlled to be within the above range.

<Impact Resistance Improver>

As the impact resistance improver, preferred is a polyolefin type copolymer having at least one type of functional group such as an anhydride group, an acid group, etc.

The polyolefin type copolymer is preferably one which has a glass transition temperature (Tg) of at most −10° C., and a flexural module of at most 100 MPa as defined in ISO178. As the impact resistance improver, together with the polyolefin type copolymer or the like, one or more polymers having an epoxy group may be used in combination. The impact resistance improver will form a crosslinked elastomeric phase in the second layer, thereby to reduce the flexural modulus of the second layer.

In this specification, the glass transition temperature means a midpoint glass transition temperature measured by a differential scanning calorimetry (DSC) method.

Further, as the impact resistance improver, impact resistance improvers described in WO 2005/071301 (e.g. an (ethylene and/or propylene) α-olefin type copolymer, an (ethylene and/or propylene)·(α, β-unsaturated carboxylic acid and/or unsaturated carboxylic ester) type copolymer, an ionomer polymer, an aromatic vinyl compound·conjugated diene compound type block copolymer, etc.) are also preferred.

Specifically, for example, a copolymer of ethylene, butyl acrylate and maleic anhydride (as a mass ratio, ethylene/butyl acrylate/maleic anhydride=68.5/30/1.5), a copolymer of ethylene, methyl acrylate and glycidyl methacrylate (as a mass ratio, ethylene/methyl acrylate/glycidyl methacrylate=65/30/5), etc. may be mentioned.

As the impact resistance improver, one having a flexural modulus at 23° C. of at most 500 MPa, is preferred, from such a viewpoint that a sufficient effect of improving impact resistance is easily obtainable.

The content of the impact resistance improver in the second layer, may suitably be set depending on the types of the polyamide (B) and the impact resistance improver, so that the flexural modulus of the second layer would be in the proper range.

As the impact resistance improver, one type may be used alone, or two or more types may be used in combination.

<Components Other than the Impact Resistance Improver>

The second layer may contain resin components other than the polyamide (B) and the impact resistance improver, within such a range that the flexural modulus would be at most the above-mentioned upper limit value and that the effects of the present invention would not be impaired.

The resins other than the polyamide (B) and the impact resistance improver, may, for example, be a polyamide other than the polyamide (B), the above-described copolymer (A) or a fluorinated resin other than that, and the above-mentioned other resins.

The polyamide other than the polyamide (B) may, for example, be a homopolymer such as polyundecanamide (polyamide 11), polydodecanamide (polyamide 12), polyethylene adipamide (polyamide 26), polyhexamethyleneazelamide (polyamide 69), polyhexamethylene undecamide (polyamide 611), polyhexamethylene dodecamide (polyamide 612), polynonamethylne adipamide (polyamide 96), polynonamethylene azelamide (polyamide 99), polynonamethylene sebacamide (polyamide 910), polynonamethylene undecamide (polyamide 911), polydecamethylene adipamide (polyamide 106), polydecamethylene azelamide (polyamide 109), polydecamethylene sebacamide (polyamide 1010), polydecamethylene dodecamide (polyamide 1012), polydodecamethylene adipamide (polyamide 126), polydodecamethylene azelamide (polyamide 129), polydodecamethylene sebacamide (polyamide 1210), polydodecamethylene dodecamide (polyamide 1212), etc., or a copolymer formed by using plural types of raw monomers forming such homopolymers.

Further, poly-m-xylylene speramide (polyamide MXD8), poly-m-xylylene azelamide (polyamide MXD9), poly-m-xylylene sebacamide (polyamide MXD10), poly-m-xylylene dodecamide (polyamide MXD12), poly-m-xylylene terephthalamide (polyamide MXDT), poly-m-xylylene isophthalamide (polyamide MXDI), poly-m-xylylene naphthalamide (polyamide MXDN), polybis(4-aminocyclohexyl)methane dodecamide (polyamide PACM12), polybis (4-aminocyclohexyl)metane terephthalamide (polyamide PACMT), polybis(4-am inocyclohexyl)methane isophthalamide (polyamide PACMI), polybis(3-methyl-4-am inocyclohexyl)methane dodecamide (polyamide dimethyl PACM12), polyisophorone adipamide (polyamide IPD6), polyisophorone terephthalamide (polyamide IPDT), polyhexamethylene isophthalamide (polyamide 6I), polynonamethylene isophthalamide (polyamide 9I), polynonamethylene hexahydrophthalamide (polyamide 9T(H)), polydecamethylene isophthalamide (polyamide 10I), polydecamethylene hexahydroterephthalamide (polyamide 10T(H)), polyundecamethylene isophthalamide (polyamide 11I), polyundecamethylene hexahydroterephthalamide (polyamide 11T(H)), polydodecamethylene isophthalamide (polyamide 12I), polydodecamethylene hexahydroterephthalamide (polyamide 12T(H)), or a copolymer formed by using plural types of raw material monomers for these polyamides and/or raw material monomers for the above aliphatic copolymers, may be mentioned.

As the polyamide other than the polyamide (B), or said other resin, one type may be used alone, or two or more types may be used in combination. As other resin, PPS is preferred.

In a case where the second layer contains a resin component other than the polyamide (B) and the impact resistance improver, its content is preferably at least 5 parts by mass, more preferably at least 20 parts by mass, most preferably at least 30 parts by mass, per 100 parts by mass of the polyamide (B). The upper limit for the content of the resin component is preferably at most 100 parts by mass, more preferably at most 60 parts by mass, particularly preferably at most 50 parts by mass.

The second layer may contain additives as the case requires. As additives, a stabilizer, a colorant, a plasticizer, a filler, a fiber, a surfactant, a pigment, a dye, an antioxidant, natural wax and a mixture thereof may be mentioned. One of such additives may be used alone, or two or more of them may be used in combination.

In a case where the second layer contains other components such as additives and a resin other than the polyamide (B) and the impact resistance improver, the total content of such other components is preferably such that the total content of the polyamide (B) and the impact resistance improver in the second layer would be at least the above-mentioned lower limit.

Further, the content of a plasticizer is preferably at most 15 mass % based on 100 mass % of the second layer.

[Laminate]

As mentioned above, the laminate of the invention comprises a first layer containing the copolymer (A), and a second layer containing the polyamide (B) laminated directly on said first layer.

There is no particular limitation to the thickness of each layer in the laminate, but for example, the thickness of the first layer is preferably from 0.05 to 5 mm, more preferably from 0.1 to 3 mm, particularly preferably from 0.2 to 2 mm. When the thickness of the first layer is at least the lower limit value in the above range, when formed into a laminated hose, such as an air hose for an automobile, the mechanical properties such as burst strength and properties such as resistance to diesel oil resistance, blow-by gas resistance and other chemical resistance, etc. will be improved. When it is at most the upper limit value in the above range, the above properties will be excellent without being lowered.

The thickness of the second layer is preferably from 0.05 to 5 mm, more preferably from 0.1 to 4 mm, particularly preferably from 0.2 to 3 mm. When the thickness of the second layer is at least the lower limit value in the above range, when formed into the laminated hose, the mechanical properties such as burst strength will be improved. When it is at most the upper limit value in the above range, the above properties will be excellent without being lowered.

The thickness of the first layer is, from the viewpoint of the properties and price required for the laminated hose, preferably at most the thickness of the second layer.

The thickness as the entire laminate is preferably from 0.5 to 10 mm, more preferably from 1 to 7 mm, particularly preferably from 2 to 5 mm. When the thickness of the laminate is at least the lower limit value in the above range, when formed into the above laminated hose, the mechanical properties such as bursting strength, and properties such as diesel oil resistance, blow-by gas resistance and other chemical resistance will be improved. When it is at most the upper limit value in the above range, the above properties will be excellent without being lowered.

Here, the "blow-by gas" is meant for a gas leaked into a crankcase from a combustion chamber in the compression combustion process in an engine.

The tensile strength of the laminate in the present invention is, as the tensile strength of a laminated film as measured in accordance with the tensile test method to be described later, preferably at least 2.0 MPa at 200° C., more preferably at least 2.0 MPa at 220° C., most preferably at least 1.5 MPa at 240° C. Further, the tensile elongation of the laminate is preferably at least 100% at 200° C., more preferably at least 100% at 220° C., most preferably at least 100% at 240° C. When the tensile strength and tensile elongation are within such ranges, the laminate can maintain the rigidity at high temperatures, and will be excellent in thermal stress cracking resistance and environmental stress corrosion cracking.

The laminate of the present invention may have at least one layer not corresponding to the first and second layers, as the case requires. Such a layer may be a layer containing at least one member selected from a fluorinated resin other than the above copolymer (A), a polyamide other than the above-described polyamide (B) and the above-mentioned other resins.

In the laminate, as long as the first and second layers are directly laminated, another layer may be laminated on the first layer on the side where the second layer does not exist, and/or on the second layer on the side where the first layer does not exist.

The laminate is not limited in its shape, and may be in a laminated sheet, in a three-dimensional shape wherein a laminated sheet is three-dimensionally shaped, or in a hollow laminated hose, and it may be prepared by a known method depending on its shape.

Specific examples of the method for producing the laminate include a melt lamination method, a co-extrusion lamination method, a co-extruded tube lamination method, a three-dimensional multilayer blow molding method, a three-dimensional multilayer blow molding injection molding method, etc.

In a case where the laminate is a hollow laminated hose, the laminated hose is preferably such that the first layer be disposed on the inner side than the second layer, in order to maintain the diesel oil resistance, blow-by gas resistance and other chemical resistance, when a fluid is permitted to flow inside the hose, and it is more preferred that the first layer forms the innermost layer.

There is no particular limitation as to the applications of the laminate of the present invention, and in the case of a laminated hose, it is useful for e.g. various pipings (such as a fuel hose, an air hose, a turbo air hose, a vacuum brake hose, a common rail diesel fuel hose, a DPF sensor hose, a heater hose, a refrigerant pipeline, a radiator hose, a heat-resistant hose for automobiles, a fuel transportation pipeline, a brake system piping, etc.) in transportation equipment (such as vehicles (automobiles, railway vehicles, etc,), aircrafts, etc.), heavy machinery (such as construction machines, civil engineering machinery, etc.).

Particularly an air hose for transportation equipment such as automobiles is, since the fluid flowing in the interior is high temperature and high pressure, required to have a tensile strength to withstand the pressure of the fluid even under high temperature conditions, and to have tensile elongation and flexibility to absorb vibration and pulsation in the vicinity of the engine, and to withstand shrinkage or expansion in a wide operating temperature range of from low to high temperatures. The laminated hose made of the laminate of the present invention is excellent in heat resistance and excellent in tensile strength, tensile elongation and flexibility under high temperature conditions, and is one which will not undergo interlayer peeling even when contacted with an oil component such as engine oil for a long period of time, and therefore, it is suitable for an air hose for transportation equipment such as automobiles (including a turbo air hose, a DPF sensor hose, a fuel hose, an air hose, a vacuum brake hose, a common rail diesel fuel hose, a heater hose, a refrigerant piping and a radiator hose).

EXAMPLES

Now, the present invention will be described in detail with reference to the following Examples, but the present invention is not limited thereto.

Methods for measuring various physical properties will be shown below.

Of the following Ex., Ex. 1, 2 and 4 are Comparative Examples, and Ex. 3, 5 to 10 and 21 to 30 are Examples of the present invention.

[Copolymer Composition of Fluorinated Copolymer]

The content of units (a4) was obtained by an infrared absorption spectrum analysis. Specifically, it was measured by the following procedure. The contents of other units (molar ratios) were obtained by a melt NMR (nuclear magnetic resonance) analysis and a fluorine content analysis.

<Content (mol %) of Units (a4)>

A fluorinated copolymer was press-molded to prepare a film having a thickness of 200 μm. With respect to the obtained film, the intensity of absorption derived from an acid anhydride residue appearing in the vicinity of 1,870 cm$^{-1}$ was measured by a Fourier transform infrared spectrometer (Nicolet iS10, manufactured by Thermo Fisher Scientific, Inc.). Using the measured value and the molar absorption coefficient of an acid anhydride residue obtained from a model compound (itaconic anhydride: 237 L·mol$^{-1}$·cm$^{-1}$), the content of the acid anhydride residue was calculated, and from that value, the content of the units (a4) was obtained.

<The Number of Carbonyl Group-Containing Groups>

Based on the above content of the units (a4), the number to $1 \times 10^6$ carbon atoms in the main chain was obtained.

[Melting Point (° C.) and Crystallization Temperature (° C.)]

By using a differential scanning calorimeter (DSC-220CU, manufactured by Seiko Instruments Inc.), about 5 mg of a sample was heated from room temperature to 300° C. at a rate of 10° C./min, and then cooled to 130° C. at a cooling rate of 10° C./min, whereby the temperature corresponding to the maximum value of the crystallization peak was obtained and taken as the crystallization temperature. Further, thereafter, at the time when the temperature was raised to 300° C. at a heating rate of 10° C./min, the temperature corresponding to the maximum value of the melting peak was obtained and taken as the melting point.
[Volume Flow Rate (Q Value)]

By using a flow tester manufactured by Shimadzu Corporation, at 297° C., at the time of extruding a fluororesin into an orifice with a diameter of 2.1 mm and a length of 8 mm under a load of 68.65N, the extrusion speed was obtained and taken as the Q value.
[10% Weight Loss Point]

When the temperature was raised at a rate of 10° C./min in a nitrogen atmosphere by using a differential thermogravimetric measuring apparatus (TG-DTA 6200 Type SII, manufactured by Seiko Instruments Inc.), the temperature at which the weight decreases by 10% was taken as the 10% weight loss point.
[Measurement of Storage Elastic Modulus]

A fluorinated copolymer was melted to prepare a pressed film having a thickness of 0.1 mm, and by using a dynamic viscoelasticity measuring apparatus ("DVA-225", manufactured by ITK Co., Ltd.), measurement of the storage elastic modulus was conducted. The measurement was conducted in a tension mode under a condition of frequency being 1 Hz. Of the obtained storage modulus, the values at 60° C. and 200° C. were adopted.
[Tensile Test (Tensile Strength (MPa) and Tensile Elongation (%))]

The measurement was made in accordance with the method prescribed in ASTM D-3159.

Specifically, with respect to a fluorinated copolymer and a polyamide, by using Tensilon tensile tester, manufactured by A & D Company Inc., a test piece having a thickness of 1 mm prepared by press molding, was pulled at a tensile rate of the 50 mm/min, whereby the stress and elongation were measured when the test piece was broken. Here, the sample for the measurement was mounted in a constant temperature cell adjusted to each measurement temperature (200° C., 220° C. or 240° C.) and, after a lapse of 30 minutes, subjected to the measurement.

Further, the tensile strength and tensile elongation of a fluorinated copolymer were measured also with respect to its sample before and after conducting the following blow-by gas resistance test.

Further, also with respect to the laminated film, by the above method, a tensile test was conducted at each measuring temperature (23° C., 200° C., 220° C. or 240° C.). However, as the test piece, a laminated film obtained by laminating a fluorinated copolymer film with a thickness 300 μm and a polyamide film with a thickness of 300 μm in a manner described below, was used.
[Peeling Test (Measurement of Interlayer Adhesion (N/cm))]

A laminated film was cut into a strip shape with a length of 5 cm and a width of 1 cm, to prepare a test piece. By gripping the fluorinated copolymer film of the test piece by a lower gripper of the tensile tester and gripping the polyamide film of the test piece by an upper gripper, and moving the upper gripper upwards at a rate of in 30 mm/min, the peel strength at an angle of 180 degrees was measured. The larger the peel strength, the stronger the interlayer adhesion of the laminated film.
[Blow-By Gas Resistance Test]

In a stainless steel container with a diameter of 140 mm and a height of 280 mm, as a model solution of blow-by gas, 1 kg of a mixed liquid of gas oil/diesel oil ("CF10W-30", manufactured by Nisseki Mitsubishi)/distilled water=45/45/10 (volume %) was put, and a sample was immersed in the mixed liquid and sealed and then heated for 168 hours in an oven of 125° C. Then, the sample was withdrawn from the mixed liquid, cooled to 23° C. and subjected to a tensile test.

Here, the "blow-by gas" is meant, as mentioned above, for a gas leaked into a crankcase from a combustion chamber in the compression combustion process in an engine.
[Diesel Resistance Test]

In a stainless steel container with a diameter of 140 mm and a height of 280 mm, 1 kg of diesel engine oil ("Clean Diesel Oil 5W-30", manufactured by Nissan Motor Corporation) was put, and the upper opening of the container was sealed with a laminated film. At that time, the fluorinated resin film side was disposed on the inner side. Then, the container was heated for 168 hours in an oven of 150° C. Then, the laminated film was removed from the top opening, cooled to 23° C. and subjected to a peeling test.
[Flexural Modulus]

The flexural modulus of the second layer is a value obtained by measuring the flexural modulus of the material used to form the second layer (the following PA-1 and PA-2) at 23° C. by the method in accordance with ASTM D790.
[Fluorinated Copolymers]
(Production Example 5)

A stainless steel autoclave having an internal volume of 430 L and equipped with a double helical ribbon stirring blade was deaerated, and 352 kg of $CF_3(CF_2)_5H$ (polymerization solvent), 3.2 kg of $CH_2=CHC_4F_9$ and 73 kg of 1,3-dichloro-1,1,2,2,3-pentafluoropropane (chain transfer agent) were charged and heated to 66° C. with stirring, then a mixed gas of TFE/ethylene=84/16 (mol %) was introduced until the pressure became 1.5 MPaG (gauge pressure), and 1.7 L of a $CF_3(CF_2)_5H$ solution containing 1 mass % of tert-butyl peroxypivalate (polymerization initiator) was injected, to initiate polymerization. During the polymerization, in order to maintain the pressure to be 1.5 MPaG, a mixed gas of TFE/ethylene=54/46 (mol %), $CH_2=CHC_4F_9$ in an amount corresponding to 1.6 mol % to 100 mol % of the mixed gas, and IAH (added as a 1,3-dichloro-1,1,2,2,3-pentafluoropropane solution containing 1 mass % of IAH) in an amount corresponding to 0.15 mol % were added continuously, and after charging 33 kg of the TFE/ethylene mixed gas, the autoclave was cooled and the residual gas was purged to terminate the polymerization.

The obtained slurry of a fluorinated copolymer was transferred to a 850 L granulation tank, and after adding 340 L of water, heated with stirring to remove the polymerization medium and residual monomers and to obtain a granulated product.

The obtained granulated product was dried at 150° C. for 5 hours, to obtain 34 kg of granules of the fluorinated copolymer in Production Example 5.

The copolymer composition and physical properties of the granules are shown in Table 1.
(Production Examples 1 to 4 and 6 to 10)

In the production method in Production Example 5, by adjusting the polymerization solvent, the chain transfer agent, the polymerization initiator, and the charging ratios of the respective monomers constituting the respective units, granules of fluorinated copolymers having the copolymer compositions and physical properties as shown in Tables 1 and 2 were obtained.
[Materials Used for Forming the Second Layer]
(1) PA-1

Polyamide "Rilsan HT CESV P010 TL" manufactured by Arkema, melting point: 265° C., flexural modulus (23° C.): 820 MPa, composition: "PA1010/10T" (containing "1010" in 41 mol %), intrinsic viscosity: 1.19 (no unit), terminal $NH_2$ group concentration: 55 μeq/g, tensile strength: 2.5

MPa (200° C.), tensile elongation: 24.5% (200° C.). PA-1 contains an impact resistance improver. Further, the above melting point is the melting point of the polyamide contained in PA-1.

(2) PA-2

Polyamide "Ultramid HFX37" manufactured by BASF Corp., melting point: 220° C., flexural modulus (23° C.): 750 MPa, MFR 275° C. under 5 kgf (=49N): 2.9 g/10 min, tensile strength: 1.8 MPa (200° C.), tensile elongation: 20.1% (200° C.). PA-2 contains an impact resistance improver. Further, the above melting point is the melting point of the polyamide contained in PA-2.

[Preparation of Fluorinated Copolymer Film]

The fluorinated copolymer in each of Production Examples 1 to 10 was heated and melted at temperature of the melting point+30 to 50° C. and subjected to press molding to form a fluorinated copolymer film having a thickness 300 μm for forming the first layer. Further, for measurement of the physical properties of the fluorinated copolymer film alone, films of 0.1 mm and 1 mm were prepared and subjected to the above measurement.

[Preparation of Polyamide Film]

PA-1 and PA-2 were, respectively heated and melted, and subjected to press-forming, respectively, to form two types of a polyamide film having a thickness of 300 μm for forming a second layer. Here, the temperature for heating was a temperature of the melting point of each polyamide+ 20 to 40° C. Further, for the measurement of the physical properties of each polyamide film alone, a film of 1 mm was prepared and subjected to the above measurement.

[Ex. 1 to 10, and Ex. 21 to 30]

In the combinations as shown in Tables 3 to 6, the fluorinated copolymer film and the polyamide film were laminated and heat-pressed at a temperature of the melting point of the fluorinated copolymer film+30 to 50° C. for 5 minutes, to let the fluorinated copolymer film and the polyamide film be melt-bonded, followed by cooling to obtain a laminated film in each Ex.

The initial interlayer adhesion (before the diesel resistance test) between the fluorinated copolymer film and the polyamide film in the laminated film, was measured by the above peeling test. Further, the interlayer adhesion after conducting the above diesel resistance test to the laminated film, was also measured by the peeling test. The results are shown in Tables 3 to 6.

Here, in the production of the laminated film to be subjected to the peeling test, in order to let the peeling test be performed smoothly when the fluorinate resin film and the polyamide film are laminated, an ethylene/TFE film ("Aflex film" manufactured by Asahi Glass Co., Ltd.) was interposed at one portion of the film edge to form a non-bonded end portion between the fluorinated resin film and the polyamide film.

Further, with respect to the obtained laminated film, tensile tests were conducted at 23° C., 200° C., 220° C. and 240° C., by the above method. The tensile tests were performed on the laminated films having a polyamide film formed of PA-1 (Ex. 1 to 10). The results are shown in Table 3 and Table 4.

TABLE 1

| | | | Production Examples | | | | | |
|---|---|---|---|---|---|---|---|---|
| | | | 1 | 2 | 3 | 4 | 5 | 6 |
| Composition | | Units (a1) [mol] | 54.3 | 53.3 | 55.2 | 52.5 | 53.8 | 52.5 |
| | | Units (a2) [mol] | 45.7 | 46.7 | 44.8 | 47.5 | 46.2 | 47.5 |
| | | Units (a3) [mol] | $CH_2=CHCF_3$ | | $CH_2=CHC_2F_5$ | | $CH_2=CHC_4F_9$ | |
| | | | 2.0 | 0.8 | 1.5 | 0.8 | 1.7 | 0.7 |
| | | Units (a4) [mol] | 0.1 | 0.1 | 0.1 | 0.1 | 0.1 | 0.1 |
| | | Molar ratio [(a1)/{(a1) + (a2)}] | 0.543 | 0.533 | 0.552 | 0.525 | 0.538 | 0.525 |
| | | Molar ratio [(a3)/{(a1) + (a2)}] | 0.020 | 0.008 | 0.015 | 0.008 | 0.017 | 0.007 |
| | | Molar ratio [(a4)/{(a1) + (a2)}] | 0.001 | 0.001 | 0.001 | 0.001 | 0.001 | 0.001 |
| | | Total molar amount [mol %] of units (a1) + units (a2) + units (a3) to the total molar amount | 99.9 | 99.9 | 99.9 | 99.9 | 99.9 | 99.9 |
| Physical properties | | Melting point [° C.] | 253.3 | 254.6 | 259.5 | 265.8 | 259.3 | 269.8 |
| | | Crystallization temperature [° C.] | 237.3 | 247.5 | 243.2 | 250.1 | 243.0 | 254.8 |
| | | Volume flow rate (Q value) [mm³/s] | 14.7 | 11.8 | 11.9 | 12 | 10.2 | 13.5 |
| | | 10% weight reduction point [° C.] | 472.3 | 483.8 | 474.5 | 480.7 | 483 | 482.9 |
| | | Number of carbonyl group-containing groups | 1959 | 1982 | 2165 | 1982 | 1965 | 1984 |
| | Tensile strength [MPa] | Measurement temp.: 200° C. | 2.67 | 3.03 | 4.40 | 3.71 | 6.27 | 4.54 |
| | | Measurement temp.: 220° C. | 1.57 | 1.89 | 2.60 | 2.44 | 4.01 | 3.03 |
| | | Measurement temp.: 240° C. | 1.10 | 1.14 | 1.59 | 1.27 | 2.42 | 1.83 |
| | Tensile elongation [%] | Measurement temp.: 200° C. | 30.7 | 18.7 | 431 | 185 | 569 | 427 |
| | | Measurement temp.: 220° C. | 28.0 | 59.1 | 102 | 20.9 | 541 | 55.8 |
| | | Measurement temp.: 240° C. | 23.4 | 54.1 | 35.8 | 16.8 | 457 | 24.7 |
| | Storage elastic modulus [MPa] | Measurement temp.: 60° C. | 638 | 650 | 690 | 701 | 758 | 788 |
| | | Measurement temp.: 200° C. | 38.9 | 58.3 | 43.3 | 55.3 | 42.8 | 58.9 |
| | Tensile strength [MPa] | Before blow-by gas test | Measurement temp.: 23° C. | 40.9 | 40.0 | 42.0 | 42.7 | 43.4 | 42.6 |
| | | After blow-by gas test (125° C. × 168 hrs) | Measurement temp.: 23° C. | 41.1 | 39.8 | 43.1 | 43.1 | 42.8 | 41.8 |
| | | (After test/before test) × 100 | % | 100.5 | 99.5 | 102.6 | 100.9 | 98.6 | 98.1 |
| | Tensile elongation [%] | Before blow-by gas test | Measurement temp.: 23° C. | 430 | 444 | 427 | 417 | 383 | 413 |
| | | After blow-by gas test (125° C. × 168 hrs) | Measurement temp.: 23° C. | 423 | 415 | 418 | 408 | 396 | 401 |
| | | (After test/before test) × 100 | % | 98.4 | 93.5 | 97.9 | 97.8 | 103.4 | 97.1 |

TABLE 2

| | | Production Examples | | | |
|---|---|---|---|---|---|
| | | 7 | 8 | 9 | 10 |
| Composition | Units (a1) [mol] | 52.1 | 52.1 | 55.7 | 56.7 |
| | Units (a2) [mol] | 47.9 | 47.9 | 44.3 | 43.3 |
| | Units (a3) [mol] | $CH_2=CHC_6F_{13}$ | $CH_2=CHC_6F_{13}$ | $CH_2=CHC_8F_{17}$ | $CH_2=CHC_8F_{17}$ |
| | | 1.1 | 0.9 | 1.3 | 0.7 |
| | Units (a4) [mol] | 0.1 | 0.1 | 0.1 | 0.1 |
| | Molar ratio [(a1)/{(a1) + (a2)}] | 0.521 | 0.521 | 0.557 | 0.567 |
| | Molar ratio [(a3)/{(a1) + (a2)}] | 0.011 | 0.009 | 0.013 | 0.007 |
| | Molar ratio [(a4)/{(a1) + (a2)}] | 0.001 | 0.001 | 0.001 | 0.001 |
| | Total molar amount [mol %] of units (a1) + units (a2) + units (a3) to the total molar amount | 99.9 | 99.9 | 99.9 | 99.9 |
| Physical properties | Melting point [° C.] | 261.7 | 268.0 | 261.3 | 266.8 |
| | Crystallization temperature [° C.] | 245.7 | 251.7 | 244.1 | 251.4 |
| | Volume flow rate (Q value) [mm³/s] | 9.3 | 10.3 | 10.8 | 8.9 |
| | 10% weight reduction point [° C.] | 480.6 | 482.9 | 482.3 | 476.7 |
| | Number of carbonyl group-containing groups | 1976 | 1980 | 1972 | 1984 |
| Tensile strength [MPa] | Measurement temp.: 200° C. | 5.71 | 4.96 | 5.46 | 5.37 |
| | Measurement temp.: 220° C. | 3.74 | 3.13 | 3.68 | 3.76 |
| | Measurement temp.: 240° C. | 2.29 | 1.78 | 2.18 | 2.20 |
| Tensile elongation [%] | Measurement temp.: 200° C. | 572 | 498 | 627 | 581 |
| | Measurement temp.: 220° C. | 494 | 182 | 513 | 480 |
| | Measurement temp.: 240° C. | 465 | 46.7 | 443 | 84.7 |
| Storage elastic modulus [MPa] | Measurement temp.: 60° C. | 619 | 722 | 690 | 597 |
| | Measurement temp.: 200° C. | 35.2 | 55.1 | 35.6 | 48.8 |
| Tensile strength [MPa] | Before blow-by gas test | Measurement temp.: 23° C. | 42.7 | 42.9 | 42.8 | 44.2 |
| | After blow-by gas test (125° C. × 168 hrs) | Measurement temp.: 23° C. | 41.9 | 43.5 | 44.1 | 43.8 |
| | (After test/before test) × 100 | % | 98.1 | 101.4 | 103.0 | 99.1 |
| Tensile elongation [%] | Before blow-by gas test | Measurement temp.: 23° C. | 404 | 440 | 393 | 403 |
| | After blow-by gas test (125° C. × 168 hrs) | Measurement temp.: 23° C. | 410 | 432 | 401 | 398 |
| | (After test/before test) × 100 | % | 101.5 | 98.2 | 102.0 | 98.8 |

TABLE 3

| | | | Ex. | | | | |
|---|---|---|---|---|---|---|---|
| | | | 1 | 2 | 3 | 4 | 5 |
| First layer: type of fluorinated copolymer film | | | Prod. Ex. 1 | Prod. Ex. 2 | Prod. Ex. 3 | Prod. Ex. 4 | Prod. Ex. 5 |
| Second layer: type of polyamide film | | | PA-1 | PA-1 | PA-1 | PA-1 | PA-1 |
| Interlayer adhesion [N/cm] | Before diesel test | Measurement temp.: 23° C. | 34.6 | 36.4 | 33.2 | 32.1 | 35.4 |
| | After diesel test (125° C. × 168 hrs) | Measurement temp.: 23° C. | 25.6 | 28.4 | 24.6 | 23.2 | 28.7 |
| Tensile strength [MPa] | Measurement temp.: 23° C. | | 28.2 | 27.3 | 29.6 | 29.6 | 29.4 |
| | Measurement temp.: 200° C. | | 1.88 | 1.92 | 2.94 | 2.60 | 4.36 |
| | Measurement temp.: 220° C. | | 1.09 | 1.24 | 1.82 | 1.70 | 2.82 |
| | Measurement temp.: 240° C. | | 0.74 | 0.76 | 1.11 | 0.89 | 1.76 |
| Tensile elongation [%] | Measurement temp.: 23° C. | | 93.7 | 92.3 | 116 | 113 | 112 |
| | Measurement temp.: 200° C. | | 7.87 | 4.68 | 108 | 47.5 | 136 |
| | Measurement temp.: 220° C. | | 7.16 | 14.3 | 26.5 | 5.17 | 136 |
| | Measurement temp.: 240° C. | | 5.47 | 13.2 | 9.09 | 4.36 | 110 |

TABLE 4

| | | | Ex. | | | | |
|---|---|---|---|---|---|---|---|
| | | | 6 | 7 | 8 | 9 | 10 |
| First layer: type of fluorinated copolymer film | | | Prod. Ex. 6 | Prod. Ex. 7 | Prod. Ex. 8 | Prod. Ex. 9 | Prod. Ex. 10 |
| Second layer: type of polyamide film | | | PA-1 | PA-1 | PA-1 | PA-1 | PA-1 |
| Interlayer adhesion [N/cm] | Before diesel test | Measurement temp.: 23° C. | 35.8 | 36.1 | 32.4 | 32.1 | 31.8 |
| | After diesel test (125° C. × 168 hrs) | Measurement temp.: 23° C. | 25.6 | 27.1 | 23.1 | 24.5 | 22.4 |

TABLE 4-continued

|  |  | Ex. | | | | |
|---|---|---|---|---|---|---|
|  |  | 6 | 7 | 8 | 9 | 10 |
| Tensile | Measurement temp.: 23° C. | 28.7 | 28.8 | 29.9 | 30.3 | 30.1 |
| strength | Measurement temp.: 200° C. | 3.20 | 3.96 | 3.44 | 3.68 | 3.61 |
| [MPa] | Measurement temp.: 220° C. | 2.14 | 2.51 | 2.12 | 2.45 | 2.62 |
|  | Measurement temp.: 240° C. | 1.24 | 1.59 | 1.23 | 1.59 | 1.50 |
| Tensile | Measurement temp.: 23° C. | 116 | 113 | 116 | 117 | 114 |
| elongation | Measurement temp.: 200° C. | 111 | 143 | 121 | 152 | 145 |
| [%] | Measurement temp.: 220° C. | 13.3 | 119 | 46.8 | 125 | 120 |
|  | Measurement temp.: 240° C. | 6.40 | 112 | 11.8 | 111 | 19.5 |

TABLE 5

|  |  |  | Ex. | | | | |
|---|---|---|---|---|---|---|---|
|  |  |  | 21 | 22 | 23 | 24 | 25 |
| First layer: type of fluorinated copolymer film |  |  | Prod. Ex. 1 | Prod. Ex. 2 | Prod. Ex. 3 | Prod. Ex. 4 | Prod. Ex. 5 |
| Second layer: type of polyamide film |  |  | PA-2 | PA-2 | PA-2 | PA-2 | PA-2 |
| Interlayer adhesion [N/cm] | Before diesel test | Measurement temp.: 23° C. | 37.2 | 38.1 | 35.6 | 36.3 | 38.2 |
|  | After diesel test (125° C. × 168 hrs) | Measurement temp.: 23° C. | 28.2 | 29.3 | 26.7 | 26.4 | 30.2 |

TABLE 6

|  |  |  | Ex. | | | | |
|---|---|---|---|---|---|---|---|
|  |  |  | 26 | 27 | 28 | 29 | 30 |
| First layer: type of fluorinated copolymer film |  |  | Prod. Ex. 6 | Prod. Ex. 7 | Prod. Ex. 8 | Prod. Ex. 9 | Prod. Ex. 10 |
| Second layer: type of polyamide film |  |  | PA-2 | PA-2 | PA-2 | PA-2 | PA-2 |
| Interlayer adhesion [N/cm] | Before diesel test | Measurement temp.: 23° C. | 38.2 | 36.1 | 32.4 | 32.1 | 31.8 |
|  | After diesel test (125° C. × 168 hrs) | Measurement temp.: 23° C. | 29.6 | 27.1 | 23.1 | 24.5 | 22.4 |

As shown in Tables 1 and 2, the fluorinated copolymers in Production Examples 3 and 5 to 10 were excellent in balance between the melting point, and the tensile strength, tensile elongation and storage elastic modulus (flexibility) under high temperature conditions. Further, each of the change rates in the tensile strength and the tensile elongation before and after the blow-by gas resistance test, was at most 10%, and thus, they were provided with resistance to blow-by gas.

On the other hand, the fluorinated copolymers in Production Examples 1 and 2 were inferior in tensile strength and tensile elongation under high temperature conditions, and the fluorinated copolymer in Production Example 4 tended to be inferior in tensile elongation under high temperature conditions.

As shown in Tables 3 to 6, the laminated film in each of Ex. 1 to 10 and Ex. 21 to 30, having the first layer made of the fluorinated copolymer in each of Production Examples 1 to 10 and the second layer made of PA-1 or PA-2 directly laminated, had an initial interlayer peeling strength which was sufficiently high, and even when contacted with diesel engine oil for a long period of time under high temperature conditions, the first layer and the second layer maintained the sufficient interlayer peeling strength.

On the other hand, the tensile strength and tensile elongation under high temperature conditions of the laminated film were as follows.

As shown in Table 3 and Table 4, with respect to the laminated film obtained by directly laminating the first layer made of the fluorinated copolymer in each of Production Examples 3 and 5 to 10 particularly excellent in tensile strength and tensile elongation at high temperatures, and the second layer made of PA-1 with a low flexural modulus and excellent in tensile strength and tensile elongation, the tensile strength under high temperature conditions was excellent in Ex. 3, Ex. 5 to Ex. 10 at 200° C., excellent in Ex. 5 to Ex. 10 at 220° C., and excellent in Ex. 5, 7, 9 and 10 at 240° C. The tensile elongation was excellent in Ex. 3, Ex. 5 to Ex. 10 at 200° C., excellent in Ex. 5, Ex. 7, Ex. 9 and Ex. 10 at 220° C., and excellent in Ex. 5, Ex. 7 and Ex. 9 at 240° C.

From the above results, the tensile strength and tensile elongation at 200° C. were excellent in Ex. 3 and Ex. 5 to 10. Among them, in Ex. 5 to 10, the tensile test results were good, and the heat resistance was excellent, and in Ex. 5, 7 and 9, the heat resistance was most excellent.

INDUSTRIAL APPLICABILITY

The laminate of the present invention is useful, in the form of a laminated hose, for example, for various pipings (such as a fuel hose, an air hose, a turbo air hose, a vacuum brake hose, a common rail diesel fuel hose, a DPF sensor hose, a heater hose, a refrigerant pipeline, a radiator hose, a heat-resistant hose for automobiles, a fuel transportation pipeline, a brake system piping, etc.) in transportation equipment (such as vehicles (automobiles, railway vehicles, etc.), aircrafts, etc.), heavy machinery (such as construction machines, civil engineering machinery, etc.), etc.

This application is a continuation of PCT Application No. PCT/JP2016/066479, filed on Jun. 2, 2016, which is based upon and claims the benefit of priority from Japanese Patent Application No. 2015-114710 filed on Jun. 5, 2015. The contents of those applications are incorporated herein by reference in their entireties.

What is claimed is:

1. A laminate, comprising:
a first layer containing a fluorinated copolymer and
a second layer containing a polyamide directly laminated on the first layer,
wherein
the fluorinated copolymer contains:
    units (a1) based on tetrafluoroethylene,
    units (a2) based on ethylene,
    units (a3) based on a monomer which is a copolymerizable monomer having no carbonyl group-containing group and at least a portion of which is represented by $CH_2=CX(CF_2)_nY$, where X and Y are each independently a hydrogen atom or a fluorine atom and n is an integer of 4, and carbonyl group-containing groups;

a molar ratio of the units (a1) to a sum of the units (a1) and the units (a2) ranges from 0.510 to 0.600;

a molar ratio of the units (a3) to the sum of the units (a1) and the units (a2) ranges from 0.005 to 0.030;

a proportion of a total molar amount of the units (a1), the units (a2), and the units (a3) to a total molar amount of all units contained in the fluorinated copolymer is at least 90 mol %;

the fluorinated copolymer has a melting point of at least 250° C., a tensile strength at 200° C. of at least 4.5 MPa, and a tensile elongation at 200° C. of at least 400%;

the polyamide has a melting point of at least 220° C. and is a copolyamide containing:

from 40 to 75 mol % of polyamide units (b1) based on at least one type of semi-aromatic units containing units of at least one type derived from an aromatic dicarboxylic acid and units of at least one type derived from a $C_{9-13}$ aliphatic diamine, from 20 to 50 mol % of polyamide units (b2) based on at least one type of aliphatic units having 8 to 13 carbon atoms per one nitrogen atom, and from 0 to 20 mol % of polyamide units (b3) other than the polyamide units (b1) and (b2); and the second layer has a flexural modulus at 23° C. of at most 1200 MPa.

2. The laminate according to claim 1, wherein a number of carbonyl group-containing groups in the fluorinated copolymer is from 10 to 60,000 to a number of $1\times10^6$ carbon atoms in the main chain of the fluorinated copolymer.

3. The laminate according to claim 1, wherein the carbonyl-containing groups are at least one type selected from the group consisting of a group having a carbonyl group between carbon atoms of a hydrocarbon group, a carbonate group, a carboxy group, a haloformyl group, an alkoxycarbonyl group and an acid anhydride residue.

4. The laminate according to claim 1, wherein the carbonyl-containing groups are acid anhydride residues.

5. The laminate according to claim 1, wherein the fluorinated copolymer further contains:

units (a4) based on a monomer having a carbonyl group-containing group.

6. The laminate according to claim 5, wherein the units (a4) are units based on a non-fluorinated monomer having an acid anhydride residue.

7. The laminate according to claim 1, wherein X is a hydrogen atom, and Y is a fluorine atom.

8. The laminate according to claim 1, wherein the second layer further contains an impact resistance improver.

9. The laminate according to claim 8, wherein a content of the impact resistance improver in the second layer ranges from 5 to 90 parts by mass per 100 parts by mass of the polyamide.

10. The laminate according to claim 1, which has a tensile strength at 200° C. of at least 2.0 MPa.

11. The laminate according to claim 1, which has a tensile elongation at 200° C. of at least 100%.

12. The laminate according to claim 1, which is a laminated hose.

13. The laminate according to claim 12, which is an air hose for transportation equipment.

14. The laminate according to claim 1, wherein a total molar amount of the polyamide units (b1) and (b2) to a total molar amount of all units contained in the polyamide is at least 80 mol %.

15. The laminate according to claim 1, wherein
the polyamide contains the polyamide units (b3) and
a molar amount of the polyamide units (b3) is at most 10 mol % relative to a total molar amount of all units contained in the polyamide.

16. The laminate according to claim 1, wherein the polyamide units (b2) do not include a cyclic hydrocarbon.

17. The laminate according to claim 1, wherein the molar ratio of the units (a3) to the sum of the units (a1) and the units (a2) ranges from 0.007 to 0.020.

* * * * *